(12) United States Patent
Puigcorbé Punzano et al.

(10) Patent No.: US 7,975,438 B2
(45) Date of Patent: Jul. 12, 2011

(54) JOINING DEVICE FOR HYBRID WIND TURBINE TOWERS

(75) Inventors: Jordi Puigcorbé Punzano, Barcelona (ES); Enrique Elkoroberezibar Markiegi, Arrasate (ES)

(73) Assignee: Ecotecnia Energias Renovables, S.L., Barcelona (ES)

( * ) Notice: Subject to any disclaimer, the term of this patent is extended or adjusted under 35 U.S.C. 154(b) by 0 days.

(21) Appl. No.: 12/523,712

(22) PCT Filed: Jan. 17, 2008

(86) PCT No.: PCT/EP2008/050491
§ 371 (c)(1),
(2), (4) Date: Jul. 17, 2009

(87) PCT Pub. No.: WO2008/087181
PCT Pub. Date: Jul. 24, 2008

(65) Prior Publication Data
US 2010/0005742 A1    Jan. 14, 2010

(30) Foreign Application Priority Data

Jan. 18, 2007 (EP) .................................... 07100768

(51) Int. Cl.
*E02D 27/42* (2006.01)
(52) U.S. Cl. .................... 52/169.9; 52/223.4; 52/742.17; 52/170; 52/169.13; 405/231; 405/233; 405/239; 405/244; 405/249

(58) Field of Classification Search .................. 52/169.9, 52/169.12–169.13, 170, 741.14, 741.15, 52/742.13, 742.14, 223.4, 742.17; 415/4.3, 415/4.5, 908; 416/244 R, DIG. 6; 405/229, 405/232–233, 236–239, 231, 242–249
See application file for complete search history.

(56) References Cited

U.S. PATENT DOCUMENTS 5,090,656 A * 2/1992 Brown .......................... 248/545
5,123,623 A * 6/1992 McNamara .................... 248/545
5,568,909 A * 10/1996 Timko ........................... 248/519
(Continued)

FOREIGN PATENT DOCUMENTS

DE    72067253.5    6/1973
(Continued)

OTHER PUBLICATIONS

Notification of Transmittal of the International Search Report and the Written Opinion of the International Searching Authority, May 16, 2008, European Patent Office.

*Primary Examiner* — Jeanette E. Chapman
(74) *Attorney, Agent, or Firm* — Peter B. Scull; K Kalan; Berenbaum Weinshienk PC

(57) ABSTRACT

A joining device (8) for hybrid wind turbine towers (5) intended for the fixation of a metal portion (6) of a wind turbine tower (5) to a concrete portion (7) of said wind turbine (1) which comprises a metal body (9) having a generally tubular configuration that is suitable to be fixed to the metal portion (6) of the tower (5) which in use is adjacent to the concrete portion (7), and suitable for being at least partially embedded into said concrete portion (7), said metal body (9) being provided with a number of anchoring openings (11) adapted such that the material of the concrete portion (7) passes therethrough. A hybrid wind turbine tower (5) comprises such a joining device (8) provided between one metal portion (6) and one concrete portion (7).

18 Claims, 3 Drawing Sheets

U.S. PATENT DOCUMENTS

| | | | |
|---|---|---|---|
| 5,901,525 A * | 5/1999 | Doeringer et al. | 52/835 |
| 6,302,824 B1 * | 10/2001 | MacAdam et al. | 482/37 |
| 7,152,841 B2 * | 12/2006 | Callies | 248/530 |
| 7,374,369 B2 * | 5/2008 | Jakubowski et al. | 405/244 |
| 7,530,780 B2 * | 5/2009 | Kothnur et al. | 415/4.3 |
| 2004/0093818 A1 | 5/2004 | Simmons | |
| 2005/0072067 A1 | 4/2005 | Wobben | |
| 2008/0236075 A1 * | 10/2008 | Andersen | 52/297 |

FOREIGN PATENT DOCUMENTS

| | | |
|---|---|---|
| EP | 1624137 A1 | 2/2006 |
| JP | 08312061 A * | 11/1996 |
| JP | 9195584 A | 7/1997 |
| WO | WO2005015013 A1 | 2/2005 |

\* cited by examiner

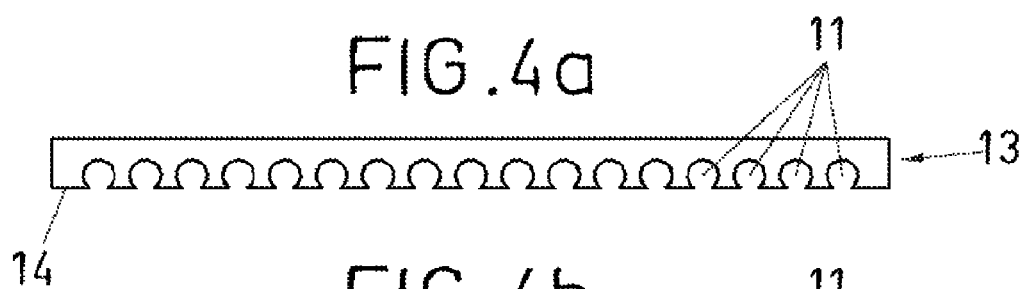
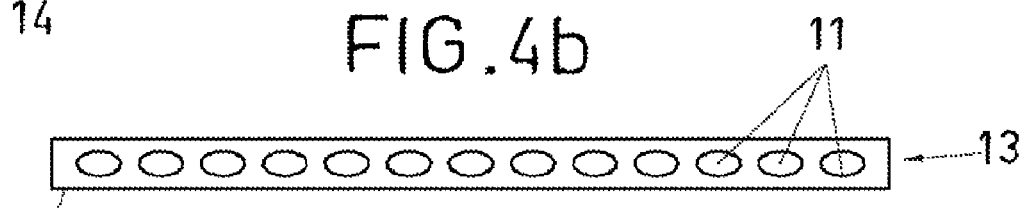
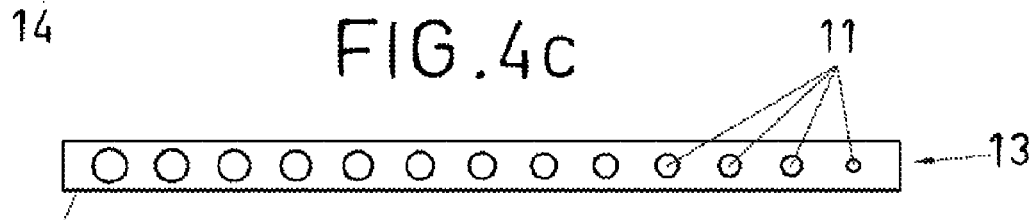
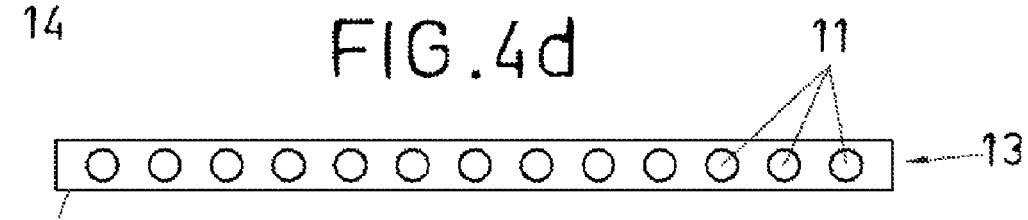
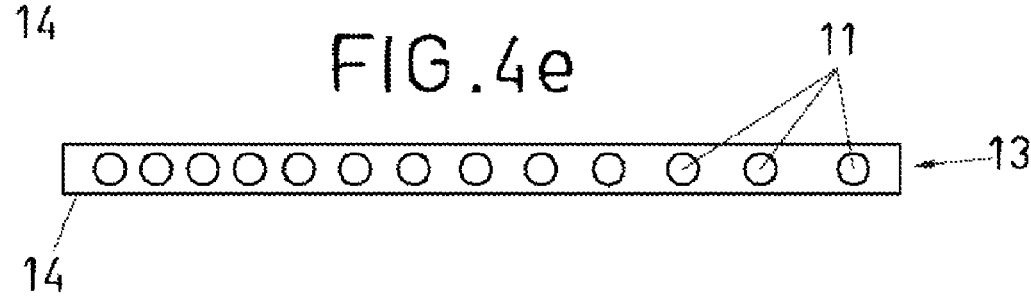
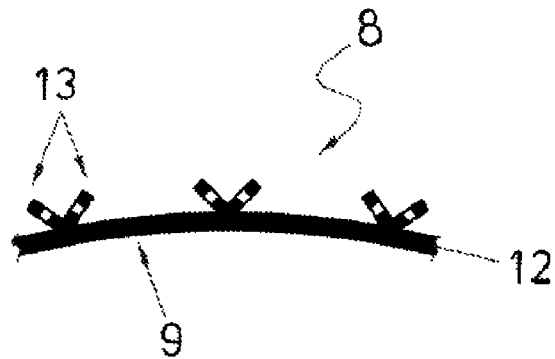

JOINING DEVICE FOR HYBRID WIND TURBINE TOWERS

FIELD OF THE INVENTION

The present invention relates to a joining device for hybrid wind turbine towers that is intended for the fixation of a metal portion of a wind turbine tower to a concrete portion of the wind turbine.

The invention further relates to a hybrid wind turbine tower that comprises at least a metal portion and at least a concrete portion and which is further provided with said joining device between said metal/concrete portions.

BACKGROUND OF THE INVENTION

The technological evolution in wind power generation is involving increasingly larger and more powerful machines which, in conjunction with taller towers, increase the output power generated by the wind. The development of taller towers has to be done according to different rules related to design criteria such as load, material strength and dynamic behavior as well as construction, transportation and installation conditions.

Up to 80 m, towers for wind power applications have been made basically using steel tubular sections. Taller towers involving high loads require more resistant structures. Due to transportation problems, bottom diameters larger than 4.5 m are not possible. This requires the steel plate thickness to be increased up to values that make the tower cost to be increased.

The use of concrete for constructing certain parts of wind turbines towers (particularly at the bottom of the tower) is a prominent alternative. Preliminary cost investigations have clearly shown that an improvement in tower costs can be achieved by substituting steel bottom portions by concrete bottom portions, specially in tower heights above 80 m. Moreover, despite the material used in the construction, the design of the concrete portions has to be carried out in accordance with the same rules that for steel portions, that is, loads, strength and mainly dynamic behavior. In order to complain with the dynamic behavior, thin-walled concrete portions have to be designed. Nevertheless, such a thin-walled concrete portion design leads to extra complexity in tower design.

Shear strength connections, such as shear studs or the like, are in general not valid in such applications due to geometrical complexity in its construction (steel reinforcement layout) and due to dimensional limitations of the tower wall.

WO2005015013 discloses a tower for a wind turbine comprising a concrete tower segment and a steel tower segment having an end portion embedded into the concrete tower segment. The steel tower segment within its embedded end portion comprises anchoring elements. Said anchoring elements project radially from an inner or an outer surface or both inner and outer surfaces of the wall of the steel tower segment. This however does not overcome the above mentioned problem of an easy steel-concrete integration in concrete thin-walled towers in wind turbine applications. This is because a very large concrete wall thickness is needed in the tower design disclosed in this document for withstanding horizontal load components resulting from such protruding elements.

DESCRIPTION OF THE INVENTION

It is an object of the present invention to provide a joining device for hybrid wind turbine towers having an easy integration with concrete thin-walled towers and providing transmission of axial loads between steel and concrete portions of the tower, thus avoiding geometric stress concentrations.

According to a first aspect, the invention provides a joining device for a hybrid wind turbine tower. The wind turbine has a metal portion and a concrete portion. The joining device of the invention is suitable for effectively and reliably fixing said metal portion to said concrete portion in a simple way.

For this purpose, the joining device of the invention comprises a metal body that is intended for being at least partially embedded in the concrete portion and fixed to the metal portion of the tower which in use is adjacent to the concrete portion.

This metal body has a generally tubular configuration that may be cylindrical or polygonal in shape. In some cases, the metal body could have a frusto conical geometry in combination with said metal body shapes.

The metal body is provided with a number of anchoring openings that are adapted such that the material of the concrete portion passes therethrough.

These anchoring openings may have variable dimensions according to requirements. They may be arranged at a defined spatial distribution in order to control and accommodate the shear strength resulting in the metal portion and the concrete portion of the tower in use, that is, when the tower structure is finally assembled and operative.

The metal body is provided with a connecting edge at one end thereof that is adapted to connect the metal body to the metal portion of the tower. This connecting edge comprises a L or T shaped flange welded to the metal body.

In one embodiment, said anchoring openings in the metal body are formed in the tubular wall thereof, but they may be formed elsewhere according to requirements.

In a further embodiment of the invention, the metal body of the device of the present invention includes a number of plates projecting therefrom. These plates may be arranged at an outer portion of the metal body, that is, projecting outwards therefrom and/or arranged at an inner portion of the metal body, that is, projecting inwards therefrom. Plates may extend substantially along the length of the metal body but, in general, plate length will depend on the number of anchoring openings formed therein.

Alternative or additionally, the anchoring openings may be formed in said plates so that the material of the concrete portion passes therethrough.

These anchoring openings (whether they are formed in the tubular wall and/or the plates of the metal body) may be of different shapes and configuration according to requirements. For example, at least some of said openings may be circular or elliptical in shape. Openings may be alternatively drop-shaped.

In any case, said anchoring openings may have a size decreasing (or increasing) in a direction towards the top of the tower and/or at least some of them may widen from the edge of the plate in a direction towards the metal body. With this decreasing (or decreasing) size arrangement, the stress distribution would be almost constant along the metal body.

Said variations in the size and the arrangement of the anchoring openings in the metal plates, as well as the number of said openings, are according to the mechanical properties (rigidity, ductility and strength) required for the steel-concrete interface.

In the joining device of the invention, loads are transmitted to the metal body through the anchoring openings which loads are substantially free of horizontal component, i.e. they are mostly axial loads. It is to be noted that in the embodiment in which the metal body has plates, the plates only serve as a carrier for such anchoring openings.

In a preferred embodiment, the plates project substantially perpendicular to said metal body but it an arrangement in which plates project from the metal body forming an angle thereto is further envisaged.

The configuration of the aforedescribed joining device may of course be combined with other solutions for hybrid tower applications involving means for fixing the metal/concrete portions of the wind turbine tower, such as anchoring protruding elements or the like.

A joining device for fixing a metal portion of a wind turbine tower to a concrete portion of said wind turbine according to the invention has a simple construction that permits an easy and quick assembly with a construction having a high mechanical performance. The joining device of the invention further provides a good axial concrete-steel interface that is suitable for any hybrid tower structure for a wind turbine. The invention is specially suitable for thin-walled concrete portions in wind turbine towers.

According to a second aspect of the invention there is provided a hybrid wind turbine tower comprising at least a metal portion and at least a concrete portion. Once such portions are all joined to each other, they form the whole tower of a hybrid wind turbine.

The hybrid wind turbine tower of the invention includes the previously described joining device of the invention. The joining device is provided between one metal portion and one concrete portion of the hybrid tower.

BRIEF DESCRIPTION OF THE DRAWINGS

*A particular embodiment of a joining device for a hybrid wind turbine tower according to the present invention will be described in the following, only by way of non-limiting example, with reference to the appended drawings, in which:

FIGS. 4a-4e are plan views showing several embodiments of plates of the metal body having different types of anchoring holes; and FIG. 5 is an enlarged view in which part of a metal body wall is shown having several metal plates formed therein.

DETAILED DESCRIPTION OF PARTICULAR EMBODIMENTS

Figure 1:
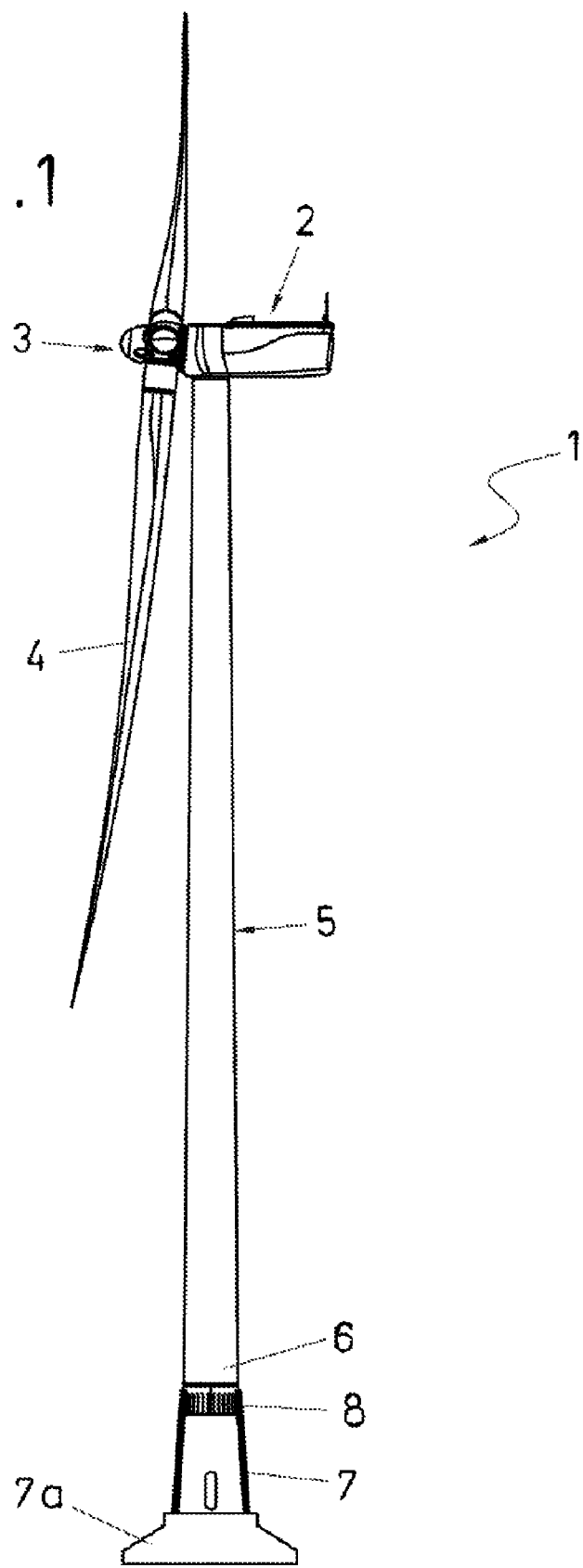
FIG. 1 is an overview of a wind turbine with a hybrid tower having a joining device according to the present invention.

FIG. 1 shows a wind turbine generally indicated at 1. Wind turbine 1 has a nacelle 2 with a rotor 3 carrying blades 4. The nacelle 2 is rotatably mounted at the top of a ninety meter high wind turbine hybrid tower 5.

This hybrid tower 5 comprises a metal portion 6, e.g. made of steel and a concrete portion 7 located below said metal portion 6. Concrete portion 7 is fitted in a foundation 7a. Portions 6, 7 are both connected to each other by a joining device 8, that is provided between the metal portion 6 and one concrete portion 7 of the hybrid tower 5.

Joining device 8 provides a steel-concrete interface and it comprises a metal body 9 having a diameter of, for example, less than 4500 mm (for example 4260 mm) for being compatible with road transport. Two different embodiments of this joining device 8 are shown in FIGS. 2 and 3.

Figure 2:
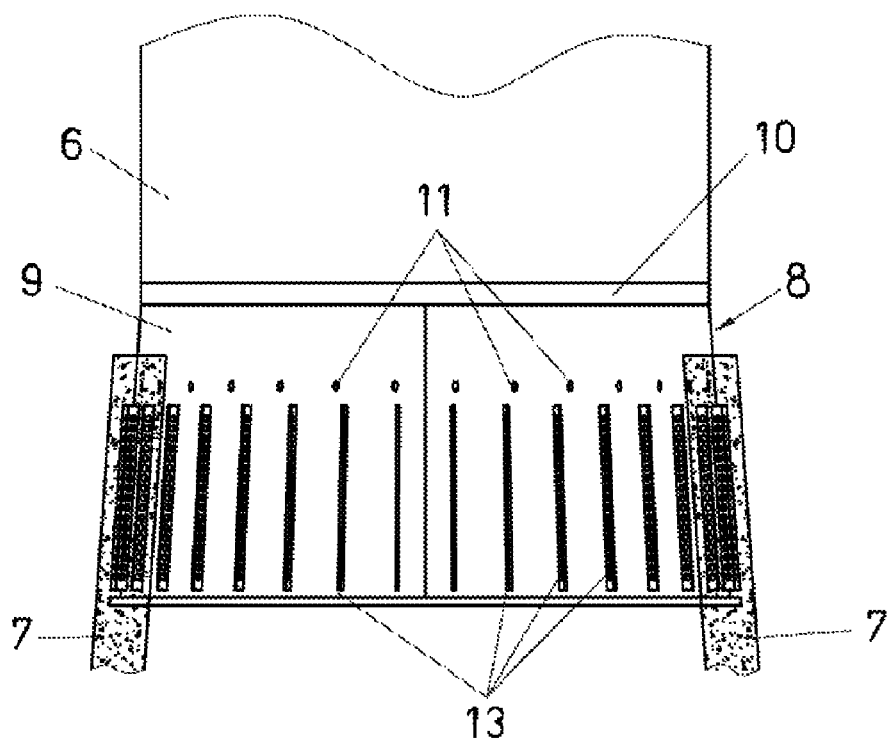
FIG. 2 is an elevational view of one embodiment of the joining device of the invention.

The metal body 9 is intended for being at least partially embedded in the concrete portion 7 when in use and fixed to the metal portion 6 of the hybrid tower 5 as shown in FIG. 2. For this purpose, the metal body 9 is provided with a L or T shaped connecting edge 10 at the upper end thereof for connecting the metal body 9 to the metal portion 6 of the tower 5.

Figure 3:
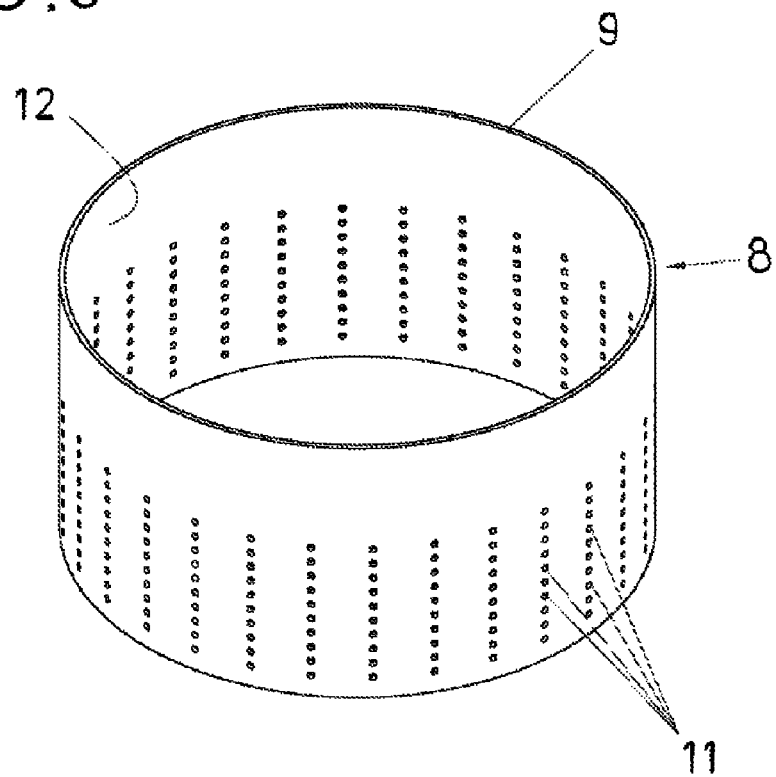
FIG. 3 is a perspective view of a further embodiment of the joining device of the invention.

The metal body 9 has a generally tubular configuration (see FIG. 3). In one embodiment, the tubular metal body 9 may be cylindrical in shape as shown in said FIG. 3. In other possible embodiments, the metal body 9 can be polygonal. In the embodiment of the metal body 9 shown in FIG. 2, the metal body 9 has a frusto conical geometry.

In both embodiments of the metal body 9 shown in said FIGS. 2 and 3, the metal body 9 is provided with a number of anchoring openings 11 adapted such that the material of the concrete portion 7 passes therethrough.

In use (when the tower structure is assembled and operative), resulting loads in the metal body 9 and the concrete portion 7 are transmitted by the anchoring openings 11 to the to the metal portion 6 of the tower 5.

In the embodiment of the metal body 9 shown in the FIG. 2, the metal body 9 has a number of plates 13 projecting therefrom. The plates 13 in the metal body 9 may project outwards from the tubular wall 12 and/or inwards therefrom.

The plates 13 extend along the length of the metal body 9 but in this embodiment they do not completely cover the entire length of the metal body 9 as shown in FIG. 2. Plate length depend on the opening configuration, as explained further on.

The plates 13 may project perpendicular to the metal body 9 but they may project therefrom forming an angle to the metal body 9 as shown in the embodiment of FIG. 5 in which pairs of pates 13 project from the tubular wall 12 of the metal body 9 forming an angle to each other and to said wall 12 substantially different from 90°.

The anchoring openings 11 in the metal body 9 may be formed anywhere therein. For example, they may be formed in the tubular wall 13 of the metal body 9, as in the embodiment shown in the FIG. 3, or they may additionally be formed in the plates 13.

The length of the plates 13, as noted above, depends on the number of anchoring openings 11 formed therein. More particularly, the minimum plate length (plate 13 having circular openings 11) is determined by:

$$L_{min} \geq \left( \frac{n° \cdot \phi \cdot t \cdot 6 \cdot f_{ck} \cdot \sqrt{3} \cdot \beta}{2 \cdot a \cdot f_{yk}} \right)$$

where:
  $L_{min}$ is the minimum opening length, in mm;
  n° is the number of anchoring openings formed in the plate;
  $\phi$ is the opening diameter, in mm;
  t is the plate thickness, in mm;
  $f_{ck}$ is the characteristic concrete compressive strength, in MPa;
  $f_{yk}$ is the characteristic metal tensile strength of the plates or the metal portion, in MPa;
  $\beta$ is a coefficient that depends on the type of the plate steel; and
  a is the welding-neck thickness.

These anchoring openings 11 (whether they are formed in the tubular wall and/or the plates of the metal body) may be of different size, shape and configuration according to requirements for the steel-concrete interface (joining device 8) and the mechanical properties (rigidity, ductility and strength) required therefor.

Openings 11 may be arranged at different defined spatial distributions (for example in vertical rows as in the embodiment depicted in FIG. 3) which again will depend on the requirements. In the embodiment shown in FIG. 3, the plates 13 have a series of vertical rows with seventeen circular openings 11.

In one example, at least some of said anchoring openings 11 may be circular as in the embodiment depicted in FIGS. 3, 4c-e, or elliptical as in the embodiment depicted in the FIGS. 2 and 4b. Openings may be alternatively drop-shaped, as shown in the embodiment of FIG. 4a.

The size of the anchoring openings 11 may be constant, as in the embodiments depicted in FIGS. 2, 3, 4a, 4b, 4d or 4e. In other cases it could be interesting the size of the anchoring openings 11 to be decreasing (or increasing), as shown in the embodiment in FIG. 4c, from e.g. 12.5 mm (top opening) to 25 mm (bottom opening). In this embodiment, it is preferred that the size of the anchoring openings 11 decreases in a direction towards the top of the tower 5 so that stress distribution is almost constant along the metal body 9.

The centre-to-centre distance of the anchoring openings 11 may be constant, as in the embodiments depicted in FIGS. 3, 4a, 4b, 4c, and 4d, but it may be varying as shown in the embodiment of FIG. 4e. In this particular case, said centre-to-centre distance of the anchoring openings 11 decreases in a direction towards the top of the tower 5.

In the case of plates 13 having circular openings 11 (FIGS. 3, 4c, 4d, 4e) the minimum opening centre-to-centre distance is determined by:

$$s_{min} \geq \left(1 + \frac{\sqrt{3}}{2} \cdot 6 \cdot \frac{f_{ck}}{f_{yd}} \cdot \frac{1}{1.25}\right) \cdot \phi$$

where:
S$_{min}$ is the minimum opening centre-to-centre distance, in mm);
f$_{ck}$ is the characteristic concrete compressive strength, in MPa;
f$_{yk}$ is the characteristic metal tensile strength of the plates or the metal portion, in MPa; and
φ is the opening diameter in mm.

At least some of the anchoring openings 11 may widen from the edge 14 of the corresponding plate 13 in a direction towards the metal body 9, as shown in the embodiment of FIG. 4a (incomplete openings). This embodiment is particularly preferred in combination with drop-shaped configuration of the anchoring openings 11 as shown in FIG. 4a.

The anchoring openings 11 serve the purpose of transmitting loads to the metal body 9 and therefore to the metal portion 6 of the hybrid tower 5. These loads transmitted to the metal body are substantially free of horizontal component, i.e. they are mostly axial loads since no protrusions are used in the configuration of the joining device 8. When a metal body 9 fitted with plates 13 is used, such plates only serve as a carrier for the anchoring openings 11 and no anchoring function is performed by said plates 13.

The invention claimed is:

1. A joining device for a hybrid wind turbine tower, said hybrid wind turbine tower comprising a concrete portion and a metal portion located adjacent to said concrete portion, said joining device being adapted to join said metal portion to said concrete portion, wherein the joining device comprises a metal body having a generally tubular configuration that is adapted to be fixed via a connecting edge to said metal portion of the hybrid wind turbine tower and is adapted to be at least partially embedded into said concrete portion of the hybrid wind turbine tower, said metal body having a number of anchoring openings adapted such that the material of the concrete portion passes through said anchoring openings, and wherein the metal body includes at least one plate projecting therefrom, the at least one plate serving as a carrier for at least some of said anchoring openings.

2. A joining device as claimed in claim 1, wherein said one or more plates are provided with a number of said anchoring openings adapted so that a portion of the material of said concrete portion passes therethrough.

3. A joining device as claimed in claim 1, wherein said one or more axial plates are arranged at an outer portion of the metal body.

4. A joining device as claimed in claim 2, wherein said one or more plates provided with a number of said anchoring openings are arranged at an outer portion of said metal body.

5. A joining device as claimed in claim 1, wherein said one or more plates are arranged at an inner portion of said metal body.

6. A joining device as claimed in claim 2, wherein said one or more plates are arranged at an inner portion of said metal body.

7. A joining device as claimed in claim 6, wherein one or more of said anchoring openings of said one or more plates are circular or elliptical in shape.

8. A joining device as claimed in claim 2, wherein one or more of said anchoring openings of said one or more plates are drop-shaped.

9. A joining device as claimed in claim 2, wherein said anchoring openings have a size decreasing in a direction towards the top of said hybrid wind turbine tower.

10. A joining device as claimed in claim 2, wherein said anchoring openings have a size increasing in a direction towards the top of said hybrid wind turbine tower.

11. A joining device as claimed in claim 2, wherein at least some of said anchoring openings widen from said edge of a plate in a direction towards said metal body.

12. A joining device as claimed in claim 1, wherein said one or more plates project substantially perpendicular to said metal body.

13. A joining device as claimed in claim 1, wherein said metal body is cylindrical in shape.

14. A joining device as claimed in claim 1 wherein said metal body is polygonal in shape.

15. A joining device as claimed in claim 1, wherein said metal body is frusto conical in shape.

16. A hybrid wind turbine tower, comprising;
(a) at least one concrete portion;
(b) at least one metal portion located adjacent to said concrete portion; and
(c) a joining device provided between one metal portion and one concrete portion, wherein said joining device comprises a metal body, wherein said metal body: comprises a tubular configuration adapted to be fixed via a connecting edge to said metal portion of said hybrid wind turbine tower and the metal body is adjacent to said concrete portion; the metal body being adapted to be at least partially embedded into said concrete portion of the hybrid tower; having one or more anchoring openings adapted such that the material of said concrete portion passes through said anchoring openings; and wherein the metal body includes at least one plate projecting therefrom, the at least one plate serving as a carrier for at least some of said anchoring openings.

17. A joining device according to claim 1, wherein the minimum plate length of said plates is determined according to the following formula:

$$L_{min} \geq \left( \frac{n^o \cdot \phi \cdot t \cdot 6 \cdot f_{ck} \cdot \sqrt{3} \cdot \beta}{2 \cdot a \cdot f_{yk}} \right)$$

where:
- $L_{min}$ is the minimum opening length, in mm;
- $n^o$ is the number of anchoring openings formed in the plate;
- $\phi$ is the opening diameter, in mm;
- $t$ is the plate thickness, in mm;
- $f_{ck}$ is the characteristic concrete compressive strength, in MPa;
- $f_{yk}$ is the characteristic metal tensile strength of the plates or the metal portion, in MPa;
- $\beta$ is a coefficient corresponding to the type of the plate steel; and
- $a$ is the welding-neck thickness.

18. A joining device according to claim 1, wherein the minimum opening centre-to-centre distance of said anchor openings is according to the formula:

$$s_{min} \geq \left( 1 + \frac{\sqrt{3}}{2} \cdot 6 \cdot \frac{f_{ck}}{f_{yd}} \cdot \frac{1}{1.25} \right) \cdot \phi$$

where:
- $S_{min}$ is the minimum opening centre-to-centre distance, in mm);
- $f_{ck}$ is the characteristic concrete compressive strength, in MPa;
- $f_{yk}$ is the characteristic metal tensile strength of the plates or the metal portion, in MPa; and
- $\phi$ is the opening diameter in mm.

* * * * *